form

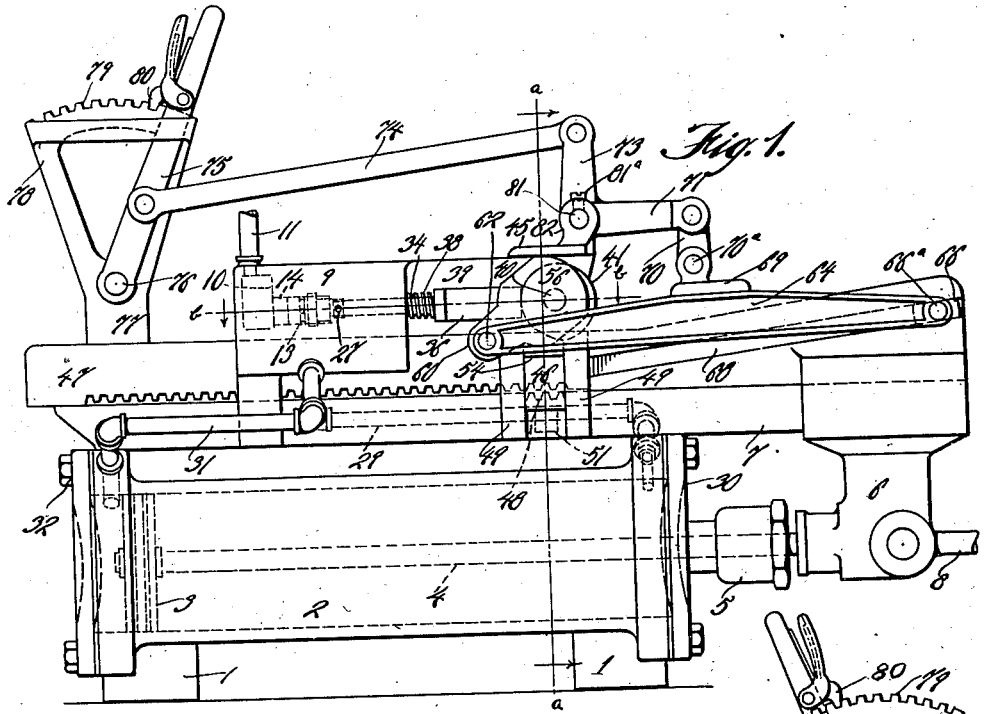

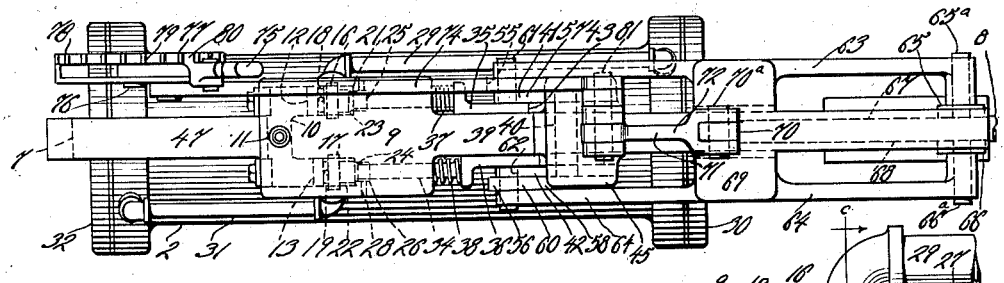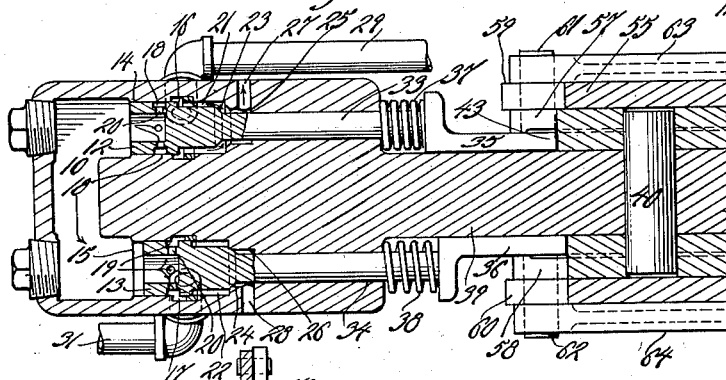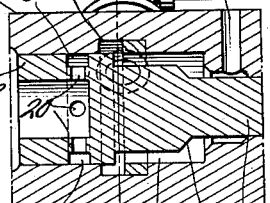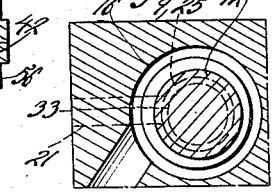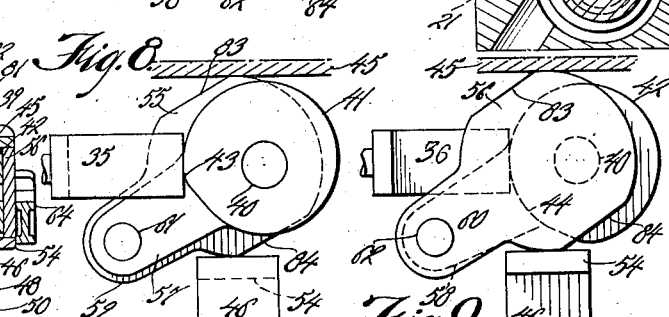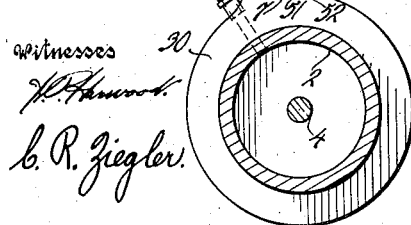

UNITED STATES PATENT OFFICE.

STEPHAN BAADER, OF PHILADELPHIA, PENNSYLVANIA, ASSIGNOR, BY MESNE ASSIGNMENTS, TO PERCY E. DONNER, OF PITTSBURGH, PENNSYLVANIA.

REVERSING-GEAR MECHANISM.

1,299,284.  Specification of Letters Patent.  Patented Apr. 1, 1919.

Application filed November 4, 1916. Serial No. 129,430.

*To all whom it may concern:*

Be it known that I, STEPHAN BAADER, a citizen of the United States, residing at Philadelphia, in the county of Philadelphia and State of Pennsylvania, have invented certain new and useful Improvements in Reversing-Gear Mechanism, of which the following is a specification.

My invention consists of an improved reversing gear mechanism and is particularly adapted for use on locomotives where it is desired to change the position and extent of movement of the inlet steam valve to effect movement of the locomotive in opposite directions. For example, my invention is adapted to operate the reverse shaft and link of a locomotive in order to perform the above noted function.

One object of my invention is to provide means for automatically operating a member which may be operatively attached to the reverse shaft or link above noted, and which will be movable to different extents at the will of the engineer or operator.

A further object of my invention is to provide means for positively locking said member in its stopped position, thereby preventing any chance of accidental movement thereof.

A still further object is to provide means for releasing said locking means when a hand lever or similar element is manually moved.

A further object is to connect said hand lever with means so that the same movement which operates to release the locking means, also operates valves to start the automatic movement of the member which is connected to the reverse shaft or link.

A still further object of my invention is to provide means operative by the movement of the device for operating said valves to effect the stopping of the mechanism and to positively lock the same in its stopped position.

Another object is to so construct my invention that the extent of movement of the above mentioned hand lever will be proportionate to the amount of the automatic movement of my invention and the construction is such that when the reversing element has moved this proportionate distance, that all of the parts will be automatically stopped and positively locked.

These objects, and other advantageous ends which will be described hereinafter, I attain in the following manner, reference being had to the accompanying drawings in which—

Figure 1 is a side elevation of my invention.

Fig. 2 is an elevation showing the opposite side of my invention.

Fig. 3 is a plan view.

Fig. 4 is a section on the line *a—a* of Fig. 1.

Fig. 5 is an enlarged fragmentary sectional plan view taken on the line *b—b* of Fig. 1.

Fig. 6 is a fragmentary sectional plan of part of the mechanism shown in Fig. 5.

Fig. 7 is a sectional view taken on the line *c—c* of Fig. 6, and

Figs. 8 and 9 are large sectional elevations of certain of the elements which I employ.

A supporting structure 1 forms a mounting for a cylinder 2 having a piston 3 movable therein, the latter being attached to a rod 4 extending through a gland or stuffing box 5 at one end of the piston, and the outer end of the piston rod is secured to a head 6 which is slidable on a guide rod 7, the latter being mounted on the upper portion of the cylinder 2 in the present instance.

The slidable head 6 is connected by a link 8 to the reverse shaft of a locomotive or other means (not shown). A valve chest or cylinder 9 has a chamber 10 having air or other fluid under pressure communicating therewith through the medium of an inlet pipe 11.

Two valves 12 and 13 are mounted to slide longitudinally within cavities 14 and 15 respectively formed within the chest 9. These cavities 14 and 15 have enlarged annular recesses 16 and 17 (see Figs. 5, 6, and 7), the valves 12 and 13 having their ends open adjacent the chamber 10 and having annular grooves 18 and 19 which communicate through perforations 20 with the chamber 10.

The opposite ends of the valves 12 and 13 are of smaller diameter than the cavities and thus provide annular spaces 21 and 22, the purpose of which will be hereinafter described. The latter mentioned ends of said valves are tapered as shown at 23 and 24, and these tapered ends are designed to engage valve seats in passages 25 and 26 which communicate by exhaust passages 27 and 28 which lead to the atmosphere.

A pipe 29 communicates with the recess 16 and the forward end 30 of the cylinder 2, and in similar manner, a pipe 31 communicates with the recess 17 and with the rear end 32 of the cylinder 2. Valve rods 33 and 34 lead from the valves 12 and 13 through the jacket 9, and at their outer ends are connected to plates 35 and 36.

Coiled springs 37 and 38 operate against the jacket 9 and the plates 35 and 36, and tend to hold the valves 12 and 13 against their respective valve seats, the springs 37 and 38 being assisted by the pressure of the fluid within the chamber 10 to accomplish this purpose, since it will be noted that the pressure of said fluid operates against the open ends of said valves and thereby tends to hold the valves on their seats; however, it will be understood that the springs 37 and 38 act as auxiliary means and hold the valves on their seats even though the fluid pressure in the chamber 10 is reduced or cut off for any purpose. It will be understood that during the operation, the fluid pressure is always within the chamber 10.

An extension 39, in the present instance cast integral with the jacket 9, forms a partition between the plates 35 and 36 and also forms a support for a pivot pin 40. Said pivot pin projects beyond opposite faces of the extension 39 and forms a pivotal support for two valve actuating cams 41 and 42, the cam 41 having its actuating surface 43 in engagement with the slide 35 as illustrated. The slide 35 is pushed or moved by said actuating surface 43 against the action of the spring 37 to move the valve 12 off its seat and to thereby throw the annular space 21 into communication with the recess 16 and the exhaust passage 27.

It will be noted that when either of the valves 12 or 13 is against its seat, that they cut off communication between the respective recesses 16 and 17 and the exhaust passages 27 and 28. However, when either of the valves are moved off their seats, the reduced portions of the valves are thrown into communication with the recesses 16 and 17, and hence the exhaust passage 27 and 28 are thrown into communication with the pipes 29 and 31.

As illustrated in the drawings, the cam 42 has its actuating surface 44 at a position remote from the plate 36, so that the latter is not effected thereby and the valve 13 is therefore in engagement with its seat and the pipe 31 is in communication with the chamber 10, so that the pressure fluid in said chamber will flow through the pipe 31 to the rear of the cylinder 2 to move the piston forward as will be hereinafter more fully described, it being noted however that the forward end of the cylinder 2 is thrown open to the atmosphere through the medium of the pipe 29 and exhaust passage 27 as above described.

A plate 45 is mounted on the top of the chest 9 and projects beyond the surfaces of the extension 39 as clearly shown in Figs. 1, 2, 3, and 4, and a yoke 46 slidably envelops the lower portion of a slidable rack 47 which is connected to the slidable head 6. The yoke 46 carries a toothed latch 48, the teeth of which when the latch is in a raised position, engage the teeth in the bottom of the rack 47 and thereby lock the latter.

The yoke 46 is held against longitudinal movement by means of guide members 49 which are spaced apart and secured to the stationary guide rod 7, the latter being slightly cut out at 50 to receive the lower portion of the yoke 46, and is also provided with a cavity 51 forming a housing for a coiled spring 52 which actuates to raise the latch 48 into locking engagement with the teeth in the lower surface of the slidable rack 47 when permitted to do so by means hereinafter described.

The upper ends of the yoke 46 are provided with outwardly projecting flanges 53 and 54, which are directly below the projecting ends of the plate 45. Mounted between and designed to engage the lower surface of the plate 5 and the upper surface of the flanges 53 and 54 are two latch operating cams 55 and 56 arranged at opposite sides of the valve actuating cams 41 and 42 respectively.

The cams 41 and 42 have arms 57 and 58, and the latch operating cams have arms 59 and 60. The arms 57 and 59 are pivotally secured together as at 61, and the arms 58 and 60 are pivoted together as shown at 62. These pivots 61 and 62 also form the pivot connection for two slidable levers 63 and 64, said levers having blocks 65 and 66 pivotally secured thereto at 65ª and 66ª and designed to slide within grooves 67 and 68 which are arranged at an incline or slant and formed in the enlarged outer end of the slidable rack 47.

The levers 63 and 64 are connected by a cross head 69 and a link 70 is pivotally connected to the cross head at 70ª to the arm 71 of a bell-crank-lever 72, the other arm 73 of said bell-crank-lever being connected by a rod 74 with a manually operative lever 75, the latter pivoted at 76 to a supporting standard 77 having a segment portion 78.

The segment 78 is provided with teeth 79 at its upper edge designed to be engaged by a hand operated latch 80, said latch 80 being operative, due to its engagement with the teeth 79 to lock the lever 75 in different pivotal positions.

The bell-crank-lever 72 is pivoted at 81 to an extension 82 on the rigid plate 45. It will be noted that the latch operating cams 55 and 56 are freely mounted between the plate 45 and the flanges 53 and 54 of the yoke 46, and that when said cams 55 and 56 are in a certain position, flat portions 83 and 84 permit the coiled spring 52 to move the yoke 46 upwardly until said latch 48 engages and locks the teeth of the rack 47.

The latch-operating cams are prevented from moving laterally since they are confined between the slidable levers 63 and 64 and the valve actuating cams 41 and 42. It will be noted that the actuating surfaces 43 and 44 of the valve actuating cams 41 and 42 are disposed in different positions, one relative to the other, the reason being that when one of said latter cams actuates its valve, the other cam must remain inoperative even though it will receive a corresponding rotary movement to the other of said cams, the reason for this will be more clearly understood during the following description of the operation of the mechanism.

In the drawings, the manually operative lever 75 is shown in its extreme forward position, this movement resulting in the actuation of the connecting rod 74, bell-cranklever 72, link 70, and the pivotal movement of the slidable levers 63 and 64 on their pivots 65$^a$ and 66$^a$ as a fulcrum, the latter movement of said levers 63 and 64 being operative to move the valve actuating cams and latch-operating cams in a position to depress the yoke 46 to disengage the latch 48 from the teeth of the rack 47 and to move the valve 12 from its seat to throw the forward end of the cylinder 2 to the exhaust.

With the parts in their above described positions, the pressure fluid from the chamber 10 will flow outwardly through the pipe 31 into the rear end of the cylinder 2, and thereby move the piston 3 forwardly and with it the link 8, slidable head 6, and rack 47. During this movement, considering the fact that the lever 75 is locked, the slidable levers 63 and 64 will be rocked, the pivot 70$^a$ being the fulcrum. This rocking movement of the levers 63 and 64 will gradually move the valve operating cams and the latch operating cams in a direction opposite to that imparted to them by the above mentioned manual movement of the lever 75, and thus move the actuating surface of the cam 43 away from the plate 35, permitting the valve 12 to seat and the latch 48 to reënter the teeth of the rack 47, and thereby positively lock the latter against accidental movement, it being obvious that when the valve 12 seats, and thereby cuts off communication between the forward end of the cylinder 2 and the atmosphere, that the piston 3 will be automatically stopped.

To move the piston 3 in an opposite direction to retract the piston rod 4, and to move the link 8 in an opposite direction, it is merely necessary to manually move the lever 75 into a rear position, this movement serving to move the valve actuating cam 43 into an operative position to move the plate 36 and with it the valve 13 to throw the rear end of the cylinder 2 into communication with the exhaust through the pipe 31 and passage 28 when the pressure fluid will move through the pipe 29 to the front end of the cylinder 2, and since the rear movement of the lever 75 also serves to move the latch-operating cams into position to remove the latch from engagement with the teeth, the rack 47 will be free to slide when the piston is moved toward the rear of the cylinder 2, it being noted that during this latter movement the levers 63 and 64 will again fulcrum on the pivot 70$^a$, and the latch-operating cams and valve-operating cams will be moved into position to effect the seating of the valve 13 and permit the spring 52 to move the latch 48 into engagement with the teeth of the rack 47.

It will be noted that each of the valves 12 and 13 serves as locking means for the fluid within the cylinder 2 to stop movement of the piston when the valves 12 and 13 are seated. It will be further noted that when the manual operative lever 75 is moved to an intermediate position on the segment 48, there will be a comparatively small movement of the latch-operating cams and of the valve operating cams and that after the piston has moved a distance which will cause the grooves 67 and 68 to rock the levers 63 and 64 into such position as to return the valve actuating cams and the latch operating cams to a position which permits the seating of the actuated valve and the engagement of the latch, the piston will be stopped.

It will therefore be understood that when a short movement of the head 6 or link 8 is desired, the lever 75 is moved only a relatively short distance to either side of a vertical center line passing through the axis of the pivot 76, but in each case the latch 48 is released by the manual movement of the lever 75 and automatically permitted to engage the rack 47 after the desired amount of movement of the piston 3 and sliding head 6 is attained.

The latch 48 therefore acts as a safety lock or an auxiliary lock to positively prevent movement after the piston 3, head 6, and link 8 has moved the desired distance. This construction renders my invention of particular value, since by it there is no chance of accidental movement of said later parts after the latch 48 has engaged the teeth of the rack 47.

I have described the arms 71 and 73 as constituting a bell-crank-lever 72. It will be understood, however, that these arms 71 and 73 are independently mounted, the arm 73 being adjustably secured to the pivot 81 by a set screw 81ª, the pivot pin 81 in the present instance being rigidly secured to the arm 73. By this construction, an adjustment may be had between the arms 71 and 73.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A valve reversing gear having a fluid pressure motor, a reversing rod operated thereby, a mechanical locking means for locking the rod in various positions, valvular mechanism for controlling the motive fluid supply to and from the motor, and camming means for operating the valvular mechanism and the lock arranged to positively cam the locking means out of engagement with the rod and to actuate the valvular mechanism to admit motive fluid to the motor.

2. A valve reversing gear having a fluid pressure motor, a reversing rod operated thereby, a spring-applied positively operated lock for locking the rod in various positions, a valvular mechanism for controlling the motive fluid supply to and from the motor, and means including cam mechanism for operating the valvular mechanism and the lock, said means being arranged to positively cam the lock out of engagement with the rod against the action of the spring when the means is operated and to actuate the valvular mechanism to admit motive fluid to the motor.

3. A valve reversing gear having a fluid pressure motor, a reversing rod operated thereby, a positively operated lock for locking the rod in various positions, valvular mechanism for controlling the motive fluid to and from the motor, means for actuating the valvular mechanism and the lock comprising connections including cam mechanism for positively unlocking the lock, and connections between the reversing gear and the actuating means for automatically returning the valvular mechanism to neutral and permitting the lock to be applied after the reversing gear has moved the required extent.

4. A valve reversing gear having a fluid pressure motor, a reversing rod operated thereby, a valve controlling the motive fluid supply to and from one side of the motor and a second valve for controlling the motive fluid supply to and from the other side of the motor, said valves being so arranged that normally both sides of the motor are in communication with each other and with the motive fluid supply, a single means for operating both valves arranged so that when moved in one direction, one of the valves only is operated to disconnect its side of the motor from the other side and from the motive fluid supply and to open an exhaust to the atmosphere, and when moved in the other direction the second valve is actuated in the same manner, and connections for causing the operating means to be actuated in synchronism with the reversing gear to automatically return the valves to neutral position after the reversing gear has moved the required extent.

5. A valve reversing gear having a fluid pressure motor, a reversing rod operated thereby, a cylindrical slide valve for one side of the motor, a second cylindrical slide valve for the other side of the motor, said valves being arranged and being normally biased to a position to admit motive fluid to both sides of the motor and establish communications between said sides, and camming means controlled by a single lever and arranged so that when actuated in one direction one of the valves is operated to disconnect one side of the motor from the other and from the motive fluid supply and exhaust it and when actuated in the other direction the other valve is operated to produce the same result on the other side of the motor, and mechanism for causing the camming means to move in synchronism with the reversing gear to automatically return the valves to neutral position after the reversing gear has moved the required extent.

6. A valve reversing gear having a fluid pressure motor, a reversing rod operated thereby, a reciprocable valvular mechanism controlling the motive fluid to and from the motor, said mechanism being arranged and being normally biased to a position to admit motive fluid to both sides of the motor and establish communication between them, a lock normally biased into engagement with the reversing rod, and camming means for actuating the valvular mechanism and the lock, said camming means being adapted when actuated to positively cam the lock out of engagement with the rod and actuate the valvular mechanism to disconnect one side of the motor from the other and from the motive fluid supply and exhaust it to atmosphere.

7. A valve reversing gear having a fluid pressure motor, a reversing rod operated thereby, a reciprocable valvular mechanism controlling the motive fluid to and from the motor, said mechanism being arranged and being normally biased to a position to admit motive fluid to both sides of the motor and establish communication between them, a lock normally biased into engagement with the reversing rod, camming means for actuating the valvular mechanism and the lock, said camming means being adapted when actuated to positively cam the lock out of engagement with the rod and actuate the valvular mechanism to disconnect one side of the motor from the other and from the motive fluid supply and exhaust it to atmosphere, and means for causing the camming mechanism to be actuated in synchronism with the reversing gear to automatically return the valvular mechanism to neutral position and permit the lock to be applied after the reversing gear has moved the required extent.

8. A reversing gear having a fluid pressure motor, a reversing rod operated thereby, a valve controlling the motive fluid to and from one side of the motor, a second valve for controlling the motive fluid to and from the other side of the motor, said valves being arranged and being normally biased to admit motive fluid to both sides of the motor and establish communication between them, a mechanical lock normally biased into engagement with the rod, and camming mechanism arranged to actuate the valves and the lock, said mechanism being arranged so that when actuated in one direction the lock is positively cammed out of engagement with the rod and one of the valves is actuated to disconnect one side of the motor from the other and from the motive fluid supply and exhaust it and, when moved in the other direction, the lock is positively cammed out of engagement with the rod and the other valve actuated to disconnect the other side of the motor and exhaust it.

9. A reversing gear having a fluid presure motor, a reversing rod operated thereby, a valve controlling the motive fluid to and from one side of the motor, a second valve for controlling the motive fluid to and from the other side of the motor, said valves being arranged and being normally biased to admit motive fluid to both sides of the motor and establish communication between them, a mechanical lock normally biased into engagement with the rod, camming mechanism arranged to actuate the valves and the lock arranged so that, when actuated in one direction, the lock is positively cammed out of engagement with the rod and one of the valves is actuated to disconnect one side of the motor from the other and from the motive fluid supply and exhaust it and, when moved in the other direction, the lock is positively cammed out of engagement with the rod and the other valve actuated to disconnect the other side of the motor and exhaust it, and means for causing the camming mechanism to operate in synhronism with the reversing rod to automatically return the valves to neutral position and permit the lock to be applied after the reversing gear has moved the required extent.

10. A reversing gear having a fluid pressure motor, a reversing rod operated thereby, a cylindrical slide valve controlling the motive fluid to and from one side of the motor, a second cylindrical slide valve controlling the motive fluid to and from the other side of the motor, said valves being arranged and being biased so that normally they admit motive fluid to both sides of the motor and establish communication between them, a mechanical lock normally biased into engagement with the rod, and camming mechanism arranged to operate the valves and the lock, so that, when operated in one direction, the lock is positively cammed out of engagement with the rod and one of the valves is moved to disconnect its side of the motor from the other side and from the motive fluid supply, and exhaust it and, when moved in the opposite direction, the lock is unlocked and the other side of the motor disconnected and exhausted.

11. A reversing gear having a fluid pressure motor, a reversing rod operated thereby, a cylindrical slide valve controlling the motive fluid to and from one side of the motor, a second cylindrical slide valve controlling the motive fluid to and from the other side of the motor, said valves being arranged and being biased so that normally they admit motive fluid to both sides of the motor and establish communication between them, a mechanical lock normally biased into engagement with the rod, camming mechanism arranged to operate the valves and the lock so that, when operated in one direction, the lock is positively cammed out of engagement with the rod and one of the valves is moved to disconnect its side of the motor from the other side and from the motive fluid supply and exhaust it and, when moved in the opposite direction, the lock is unlocked and the other side of the motor disconnected, and means for causing the camming mechanism to operate in synchronism with the reversing gear to automatically return the valves to neutral and permit the lock to be applied after the reversing gear has moved the required extent.

12. In a reversing gear, a fluid pressure motor, a reversing rod operated thereby, a mechanical lock for locking the rod in various positions, valvular mechanism for controlling the motive fluid to and from the lock, and means for operating the valvular mechanism and the lock including a bar pivoted near its center to a fulcrum which may be shifted by hand, said bar having one of its ends arranged to actuate the valvular mechanism and the lock and the other end to be actuated by movements of the reversing gear, whereby the lock may be unlocked and the valvular mechanism moved to operate the motor and the valvular mechanism automatically returned to neutral position and the lock permitted to be applied after the reversing gear has moved to an extent proportionate to the movement of the manually shiftable fulcrum.

13. In a reversing gear, a fluid pressure motor, a reversing rod operated thereby, a mechanical lock for locking the rod, valvular mechanism for controlling the motive fluid to and from the motor, camming means for operating the valvular mechanism and the lock, and a bar pivoted near its center to a fulcrum whose position may be manually changed, said bar being connected at one end to the camming means and having its other end arranged to be actuated by movements of the reverse gear, whereby the lock may be unlocked and the valvular mechanism actuated to operate the motor by shifting the position of the fulcrum and after the reversing gear has moved to an extent proportionate to the movement of the fulcrum the valvular mechanism is automatically returned to neutral and the lock permitted to be applied.

14. In a reversing gear, a fluid pressure motor, a reversing rod operated thereby, a mechanical lock normally biased to lock said rod, a valve for controlling the motive fluid to one side of the motor, a second valve for controlling motive fluid to the other side of the motor, camming means for alternately actuating said valves and forcing the lock to unlocked position, a bar pivoted near its center to a fulcrum, and manual means for shifting the position of the fulcrum, one end of said bar being connected to said camming means and the other end being arranged to be moved by movements of the reversing gear, whereby the lock may be positively cammed to unlocked position and one of the valves actuated to disconnect one side of the motor from the other and from the motive fluid supply and exhaust it and after the reversing gear has moved to an extent proportionate to the movement of the fulcrum the valve is automatically returned to neutral and the lock applied.

In testimony whereof I have signed my name to this specification in the presence of two subscribing witnesses.

STEPHAN BAADER.

Witnesses:
RHODA E. GILLIES,
CHAS. E. POTTS.